(12) United States Patent
Turner

(10) Patent No.: US 8,364,159 B2
(45) Date of Patent: Jan. 29, 2013

(54) METHOD AND APPARATUS FOR MONITORING A CHANNEL DURING AN ACTIVE SESSION IN A WIRELESS COMMUNICATION SYSTEM

(75) Inventor: Simon Turner, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 2341 days.

(21) Appl. No.: 10/075,058

(22) Filed: Feb. 11, 2002

(65) Prior Publication Data

US 2003/0152044 A1    Aug. 14, 2003

(51) Int. Cl.
*H04W 72/00* (2009.01)
*H04W 4/00* (2009.01)

(52) U.S. Cl. .................... 455/451; 370/329

(58) Field of Classification Search ........... 370/330, 370/331, 329, 468, 352, 335, 336, 320, 332, 370/395.2, 337, 344, 321, 385, 386; 455/436, 455/426.1, 428, 13.4, 442, 452.2, 464, 515, 455/524, 525, 134, 135; 379/32.01, 93.35; 709/227, 201, 202, 229, 226
See application file for complete search history.

(56) References Cited

U.S. PATENT DOCUMENTS

| | | | |
|---|---|---|---|
| 5,959,984 A * | 9/1999 | Dent | 370/347 |
| 6,201,962 B1 * | 3/2001 | Sturniolo et al. | 455/432.2 |
| 6,269,402 B1 * | 7/2001 | Lin et al. | 709/227 |
| 6,487,399 B1 * | 11/2002 | Rajaniemi et al. | 455/226.1 |
| 6,614,769 B1 * | 9/2003 | Erlick et al. | 370/331 |
| 6,738,373 B2 * | 5/2004 | Turner | 370/352 |
| 6,768,722 B1 * | 7/2004 | Katseff et al. | 370/260 |
| 6,836,478 B1 * | 12/2004 | Huang et al. | 370/352 |
| 6,850,604 B2 * | 2/2005 | Cannell et al. | 379/93.01 |
| 6,889,050 B1 * | 5/2005 | Willars et al. | 455/452.2 |
| 6,937,861 B2 * | 8/2005 | Vanghi | 455/436 |
| 6,985,453 B2 * | 1/2006 | Lundby et al. | 370/311 |
| 6,993,010 B1 * | 1/2006 | Peshkin | 370/352 |
| 7,061,866 B2 * | 6/2006 | Connor | 370/235 |
| 7,596,090 B2 * | 9/2009 | Black | 370/234 |

* cited by examiner

*Primary Examiner* — Hanh N Nguyen
(74) *Attorney, Agent, or Firm* — Abdollah Katbab

(57) ABSTRACT

A method according to one embodiment of the invention monitors a paging channel from one wireless network during an active communications session with another wireless network.

29 Claims, 19 Drawing Sheets

METHOD AND APPARATUS FOR MONITORING A CHANNEL DURING AN ACTIVE SESSION IN A WIRELESS COMMUNICATION SYSTEM

BACKGROUND

1. Field of the Invention

This invention relates to wireless communications. Specifically, this invention relates to wireless communications with more than one network.

2. Background Information

FIG. 1 shows a model for a wireless communications system that includes an access terminal (AT) 1000, a network for wireless communications (hereinafter 'wireless network') 1002, and a service network 1004. The service network 1004 may be a telephone network such as the public switched telephone network (PSTN), a packet-switched data network such as the Internet, or a private network such as a local-area or wide-area network. The wireless network 1002 may be a subscriber network for cellular telephony and/or packet data services. Alternatively, the wireless network 1002 may be a private network (for example, a network that provides wireless connectivity throughout a facility). The AT 1000 may be a mobile unit such as a cellular telephone, a personal digital assistant (PDA) with integrated wireless connection capability, a wireless modem or network card coupled to a laptop computer, or a vehicular access terminal. Alternatively, the AT 1000 may be a fixed unit such as a wireless local loop (WLL) handset or a public access terminal.

A radio access network (RAN) 1006 within the wireless network communicates with the AT 1000 over an air interface. The air interface may include several traffic and control signals, carried over channels that are mutually orthogonal (or nearly orthogonal) in terms of time, frequency, and/or coding. The wireless network 1002 may include several (or many) RANs 1006 placed at physically separate locations such that the geographical service area of the network is extended. In such case, a mechanism may be provided to allow a continuity of communications as the AT 1000 moves between the coverage areas of the RANs 106 (e.g. via a handoff of the air interface from one RAN to another). Each RAN 1006 is coupled to the service network 1004 over one or more channels that may be wired, optical, and/or wireless.

FIG. 2 shows a wireless communications system including a wireless network N10 that communicates with an AT 10 over an air interface A10. Through networks N10 and 40, AT 10 may communicate with a remote server 50. In this example, air interface A10 conforms to Interim Standard IS-856 [e.g. as set forth in "cdma2000 High Rate Packet Data Air Interface Specification", PN-4875 (TR-45), Telecommunications Industry Association (TIA), Arlington, Va., Sep. 12, 2000]. Such an air interface includes several code-division multiple-access (CDMA) channels for traffic and control signals that are carried over specified uplink and downlink frequency bands.

Wireless network N10 includes a packet data serving node (PDSN) 30 that supports authenticated packet data exchange with a packet-switched data network 40 such as the Internet. Each RAN 20 (also called a radio network node or RNN) may include a base transceiver station (BTS), which terminates the radiolink with the AT, and a base station controller (BSC), which terminates the physical link to PDSN 30 (BTS and BSC not shown). Logical link L10 between a RAN 20 and PDSN 30 is established only as needed to support a session with the AT. In this example, link L10 is a RP link as described in Interim Standard IS-835 [TIA/EIA/IS-835, "Wireless IP Network Standard for cdma2000," Telecommunications Industry Association, Arlington, Va.].

It may be desirable for a single AT to have the capacity to communicate with more than one service network. For example, it may be desirable for a single AT to have the capacity to provide both wireless voice connectivity with the PSTN and wireless packet data connectivity with the Internet. FIG. 3 shows an example of a wireless communications system in which a dual-use AT 1010 may communicate with two different service networks 1014, 1016 over a single air interface via RAN 1012.

FIG. 4 shows a particular example of a system as shown in FIG. 3, including a wireless network N20 that operates in compliance with Interim Standard IS-2000 [a six-part document defining "cdma2000 spread spectrum systems," PN-44274432 (TR-45), Telecommunications Industry Association (TIA), Arlington, Va., July, 1999]. AT 15 communicates with network N20 over an air interface A15 that is specified in the IS-2000 standards documents. Through link L20 to mobile switching center 60 (established using a protocol such as Common Channel Signaling System No. 7), a RAN 25 supports voice and SMS (Short Messaging Service) communications between the PSTN 70 and AT 15. Through RP link L30 to PDSN 30, RAN 25 also supports packet data services between a packet-switched data network 40 and AT 15. Communications with AT 15 may be handed off from one RAN 25a to another RAN 25b (e.g. as AT 15 moves between the coverage areas of the RANs), with links L20 and L30 also being handed off as appropriate.

Although air interface A15 provides for packet data services, an IS-2000-compliant network (also called a '1×' network) is optimized to carry voice traffic rather than packet data traffic. An IS-856 network does not support voice traffic, but such a network may be better suited than a 1× network to support the high data rates associated with applications such as wireless Internet connectivity. Although both types of wireless network provide access over air interfaces that include CDMA channels, it is possible to deploy IS-856 and 1× networks to have overlapping areas of coverage (for example, the two air interfaces can be implemented over different frequency allocations) to support optimized delivery of both voice and packet data services throughout a particular geographical area.

Wireless networks that conform to the IS-2000 standard are currently in place, while wireless networks that conform to the IS-856 standard are in advanced stages of development. A need exists to support the reception of communications from one wireless network during an active session with another wireless network in a manner that is compliant with existing standards and/or does not require alterations to infrastructures already in place or about to be deployed.

SUMMARY

Embodiments disclosed herein address the above stated need by transmitting a pause command to one wireless network, monitoring a channel for transmissions from another wireless network, and transmitting a resume command to the first wireless network.

DETAILED DESCRIPTION

Figure 1:
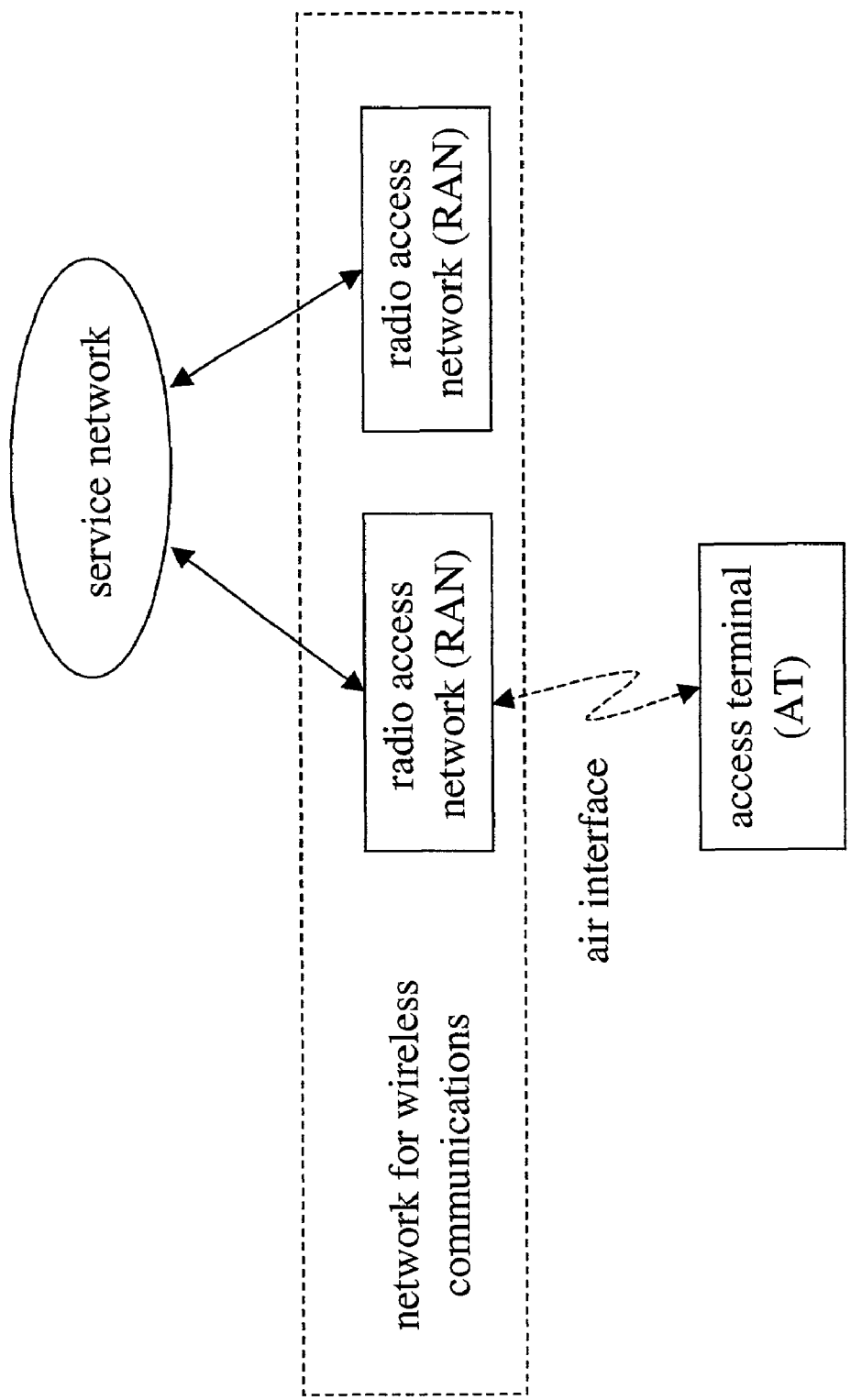
FIG. 1 shows a model for a wireless communications system.
Figure 2:
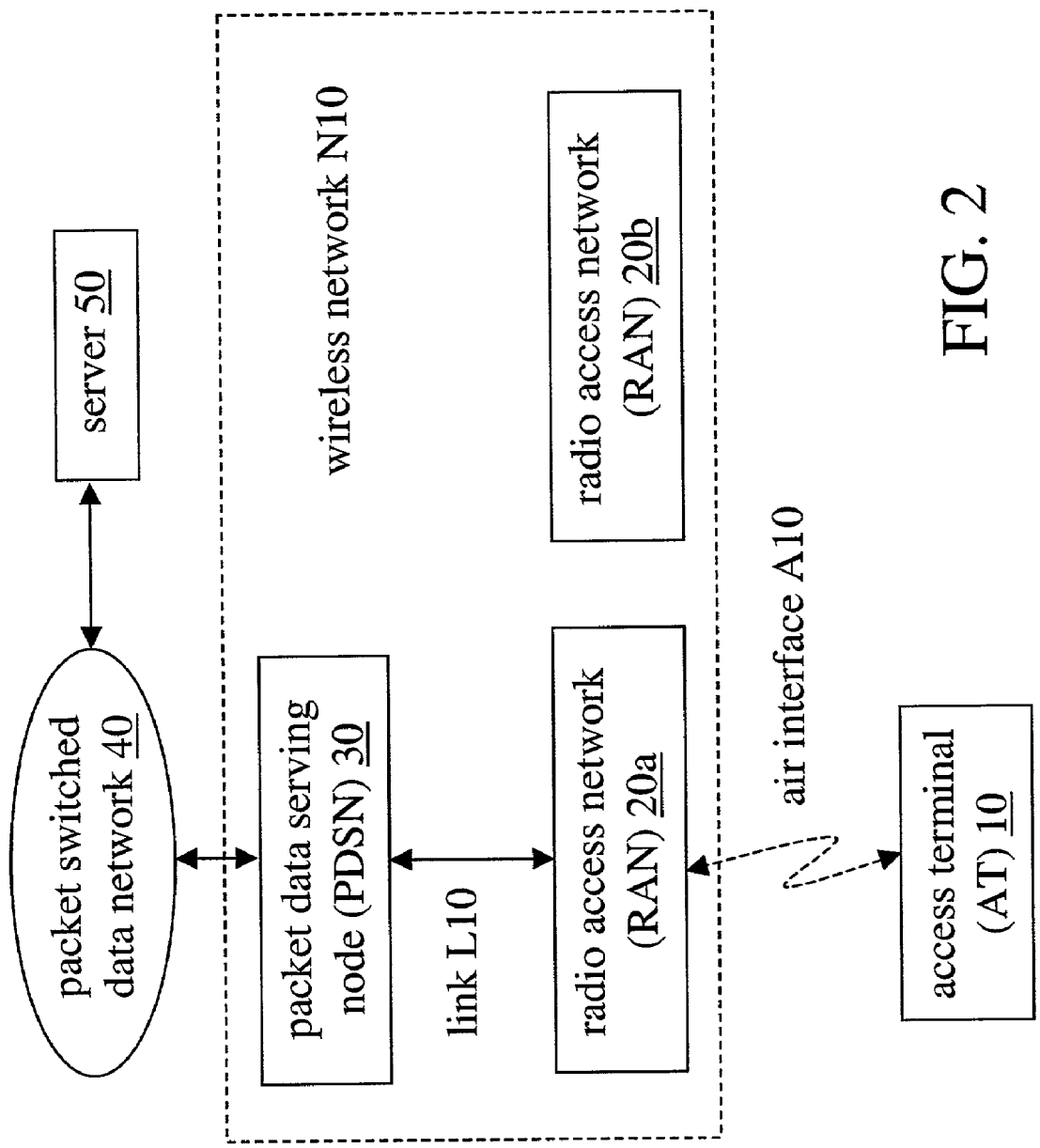
FIG. 2 shows a wireless communications system that includes an IS-856 network.
Figure 3:
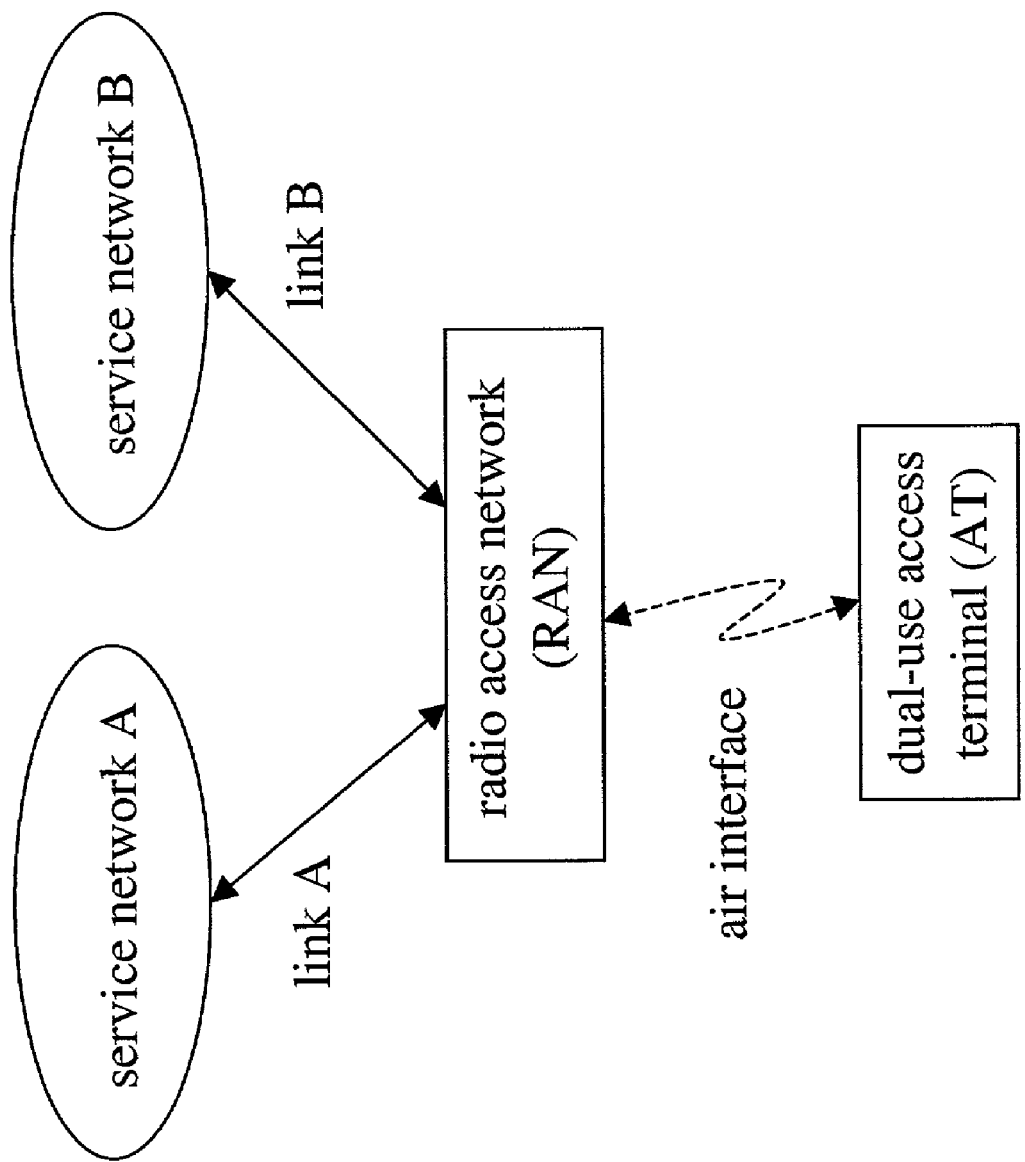
FIG. 3 shows a wireless communications system that includes a dual-use access terminal.
Figure 4:
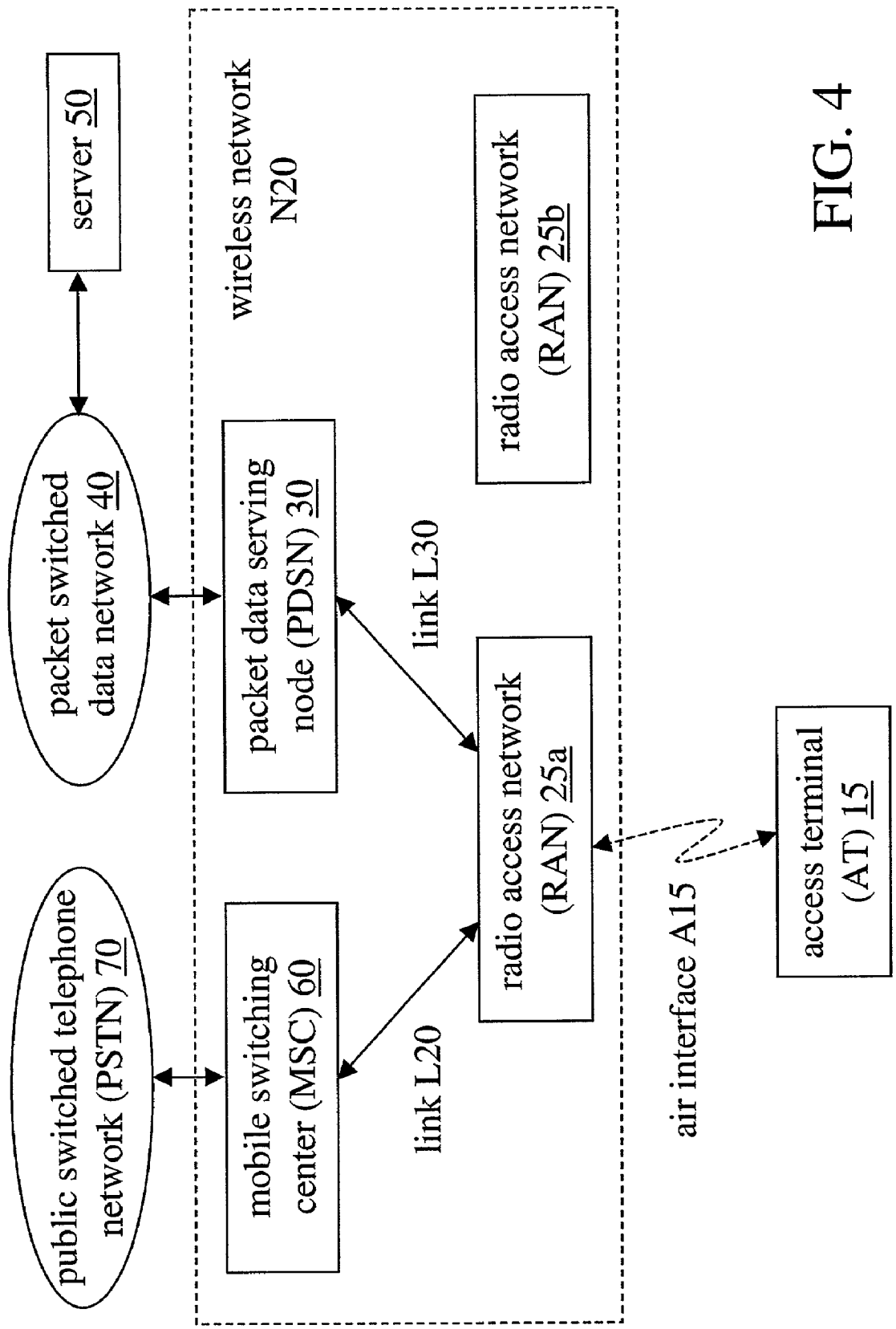
FIG. 4 shows a wireless communications system that includes a 1× network.
Figure 5:
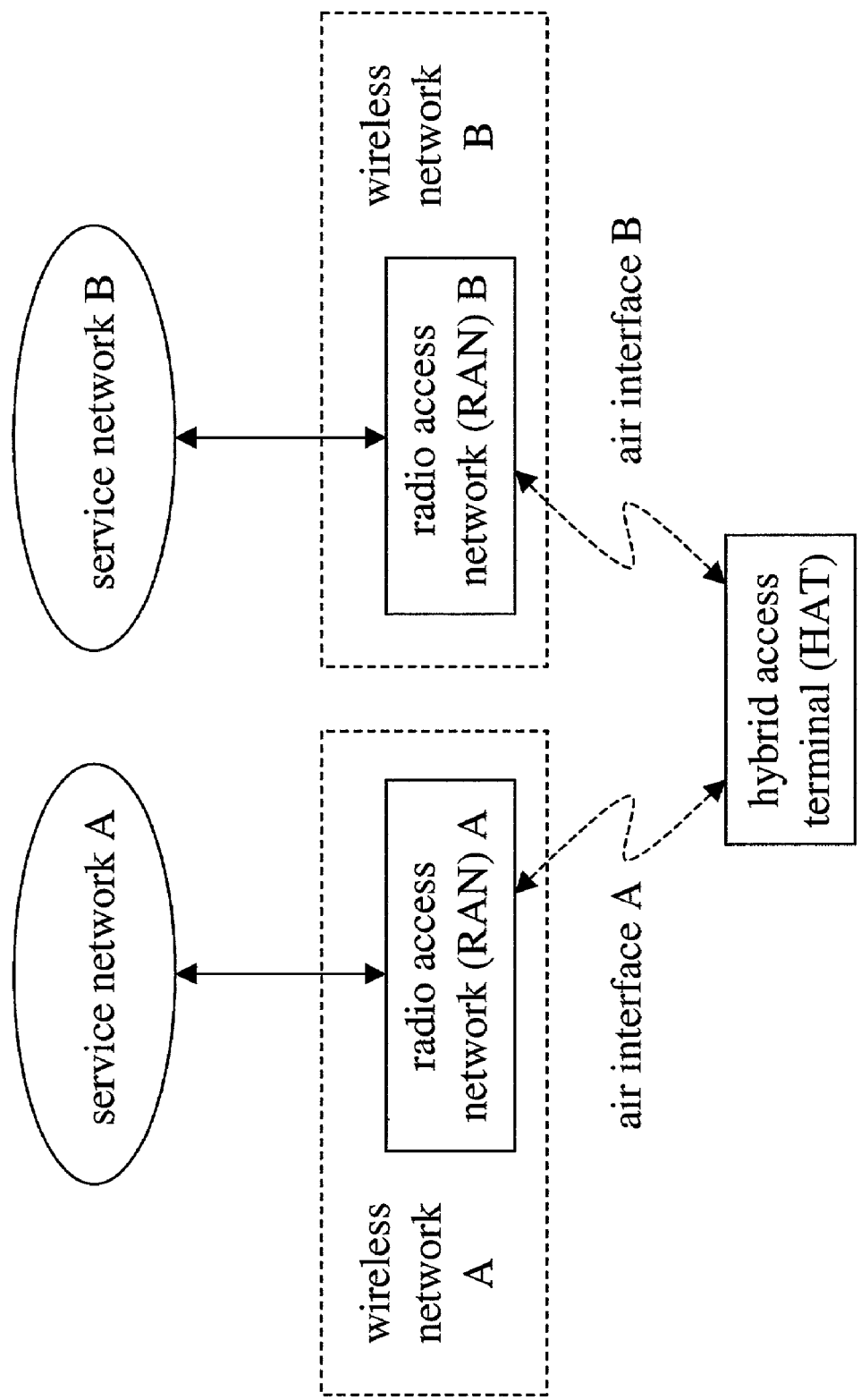
FIG. 5 shows a diagram of a dual-coverage system.
Figure 6:
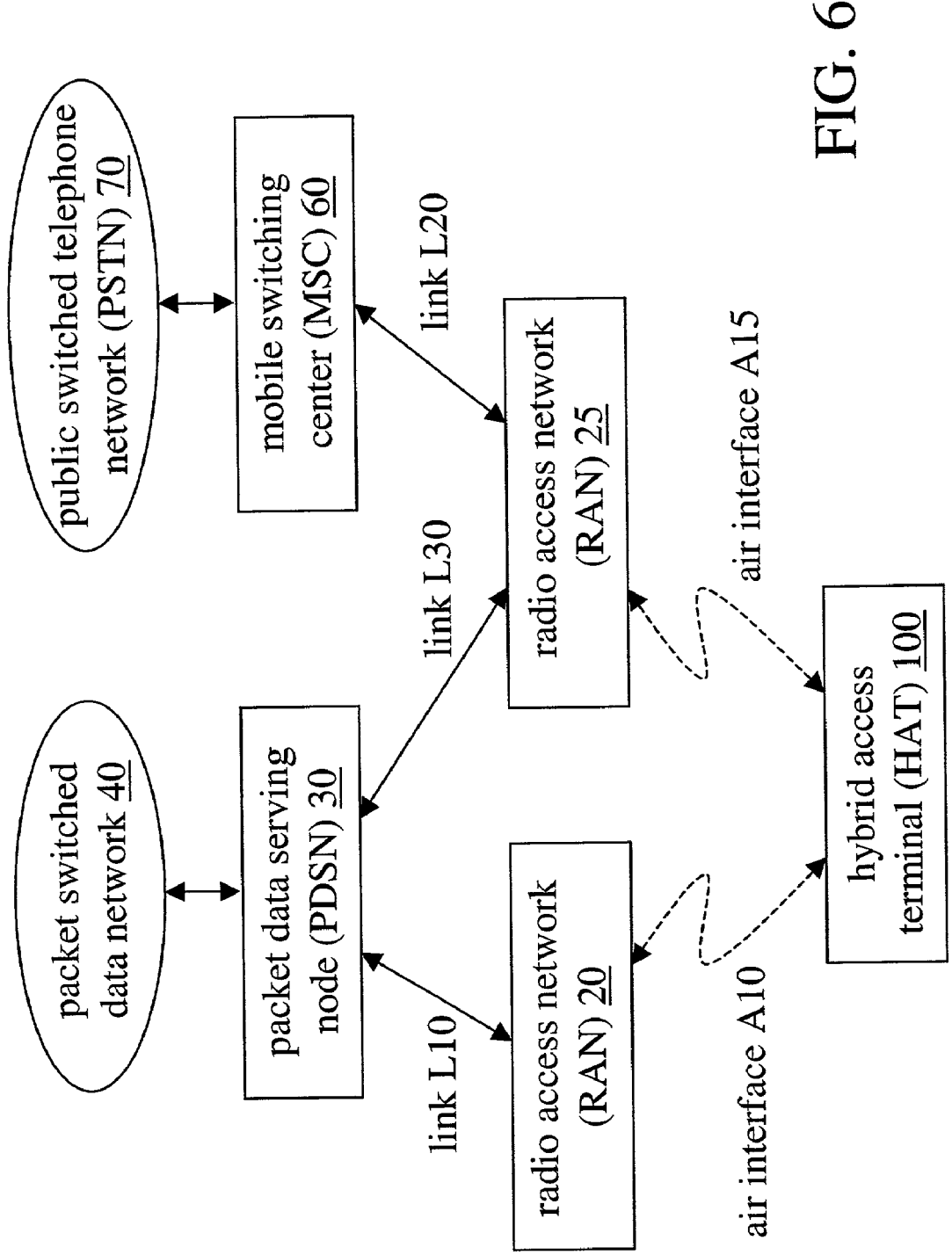
FIG. 6 shows a wireless communications system that includes a IS-856 network and a 1× network.
Figure 7:
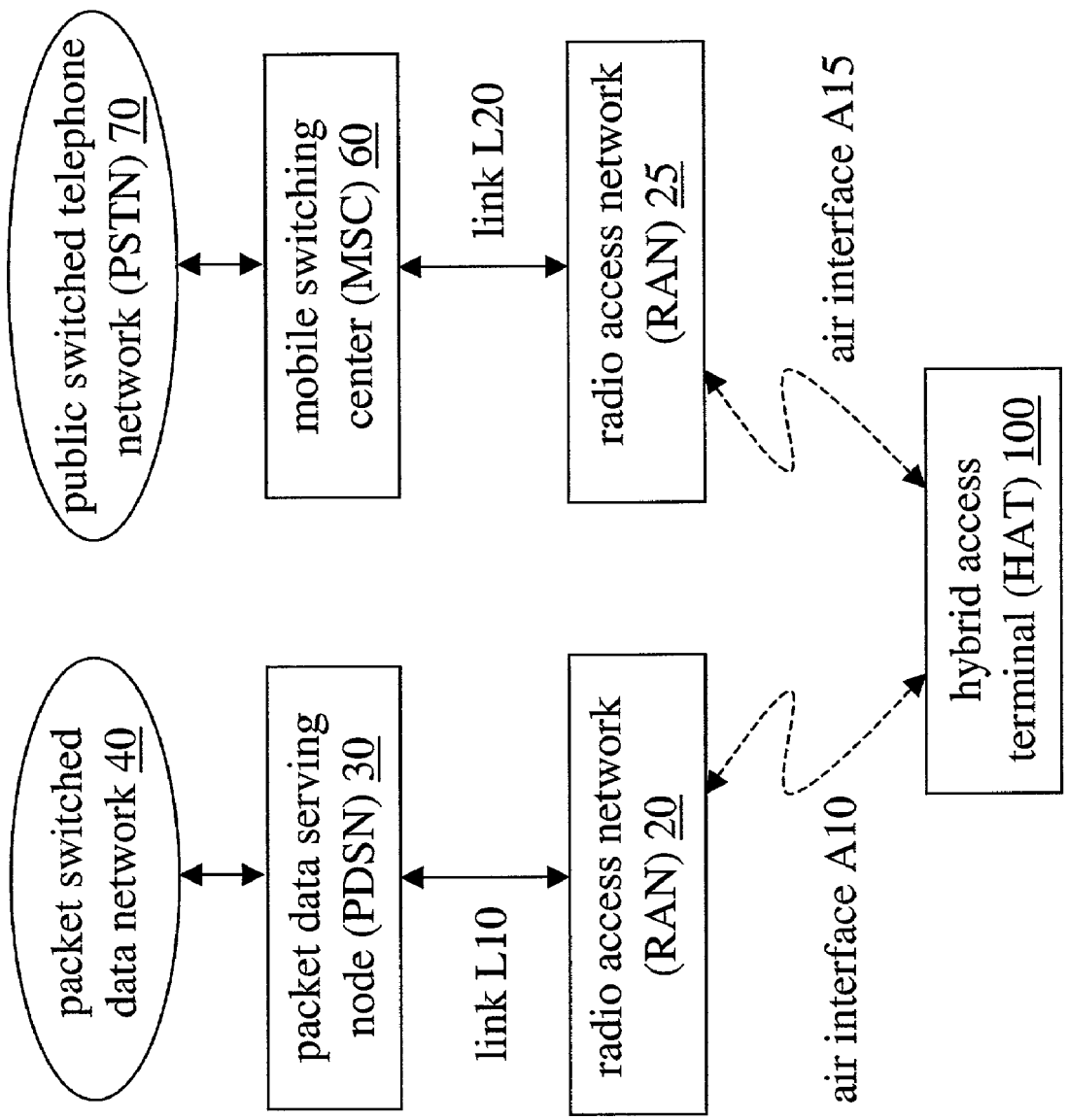
FIG. 7 shows a wireless communications system that includes a IS-856 network and a 1× network.

FIG. 5 shows a block diagram of a dual-coverage system. Within such a system, it may be desirable for a single AT 1020 (i.e. a 'hybrid AT' or HAT) to provide service through either wireless network. For example, FIG. 6 shows a wireless communications system that includes an IS-856 network (e.g. as shown in FIG. 2) and a 1× network (e.g. as shown in FIG. 4), in which a HAT 100 may communicate over the appropriate air interface with a RAN of either wireless network. As illustrated in FIG. 5, the HAT 1020 is coupled to wireless networks A and B, 1022, 1024. Each of networks A and B, 1022, 1024, is coupled to service network A and B, 1028 and 1026, respectively. FIG. 7 shows a similar system in which packet data service is available exclusively through the IS-856 network. [Although separate RANs are shown in these figures, it is possible that a single RAN may support both air interfaces A10 and A15 (and links L10 and L20).]

It may be desirable to provide a HAT that can communicate (possibly over different air interfaces) with different wireless networks. However, it may also be desirable for the HAT to be able to receive incoming communications from one wireless network even while it is active on another wireless network. For example, it may be desirable for a HAT to have the capacity to receive paging messages from a 1× network (e.g. indicating incoming voice calls) even if the HAT is actively engaged in a data session with a PDSN over an IS-856 network.

Slotted paging is a common feature of modern wireless communications systems. In a slotted paging scheme, pages directed to a particular AT are transmitted during specified time slots. If the AT is not monitoring the paging channel when the page arrives, system responsiveness will suffer. A need exists for a HAT that can maintain a predetermined level of responsiveness to incoming pages from a 1× network even when actively engaged in a data session with a PDSN over an IS-856 network.

Figure 8:
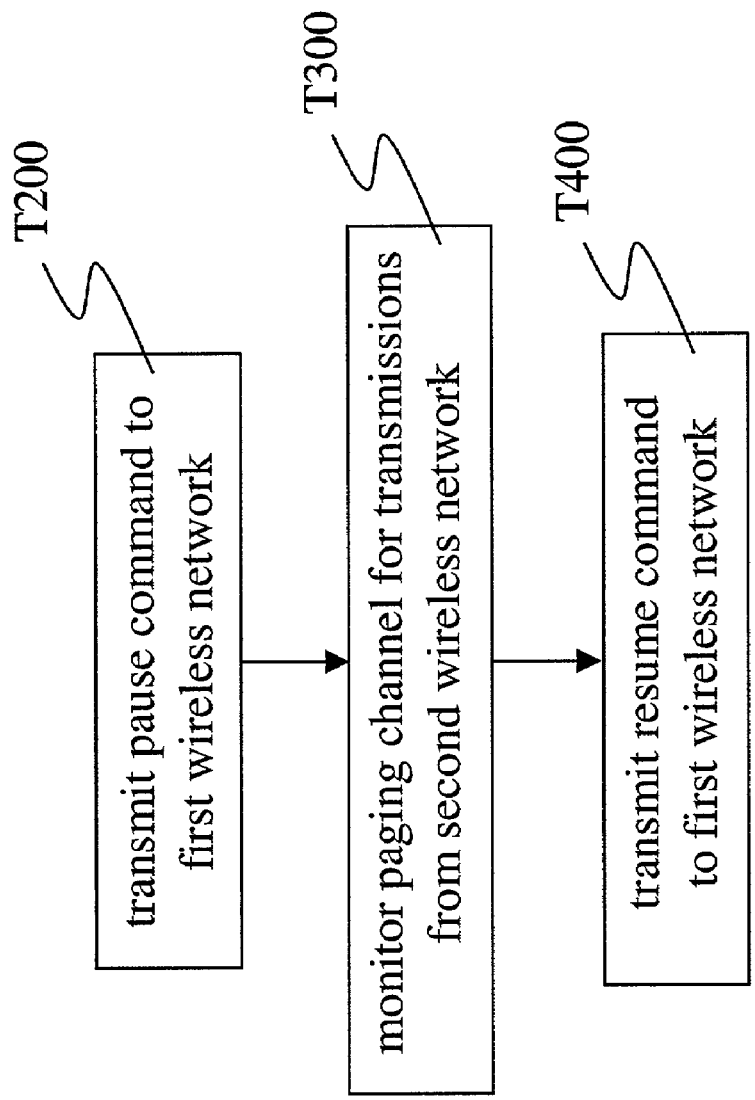
FIG. 8 shows a flowchart for a method according to an embodiment of the invention.

FIG. 8 shows a flowchart for a method according to an embodiment of the invention. In task T200, a pause command is transmitted to a first wireless network. In task T300, a paging channel is monitored for transmissions from a second wireless network. In task T400, a resume command is transmitted to the first wireless network. Note that the pause command includes a command to reduce a data rate, or indicates a null data rate. Also, the resume command may include a command to set a non-null data rate.

Figure 9:
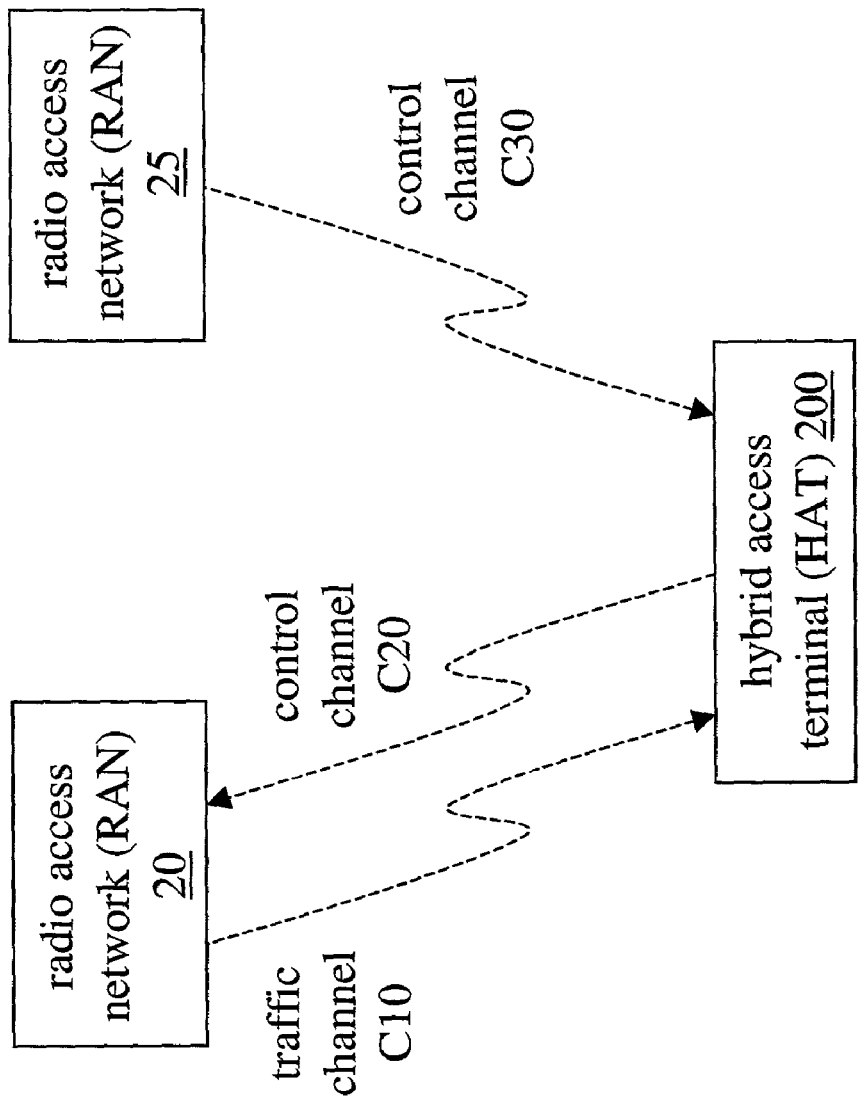
FIG. 9 shows a diagram of a system including a hybrid access terminal.

FIG. 9 shows a diagram of a system including a hybrid access terminal 200 that performs a method as shown in FIG. 8. In a particular implementation of such a system, traffic channel C10 and control channel C20 are components of an IS-856 air interface (e.g. air interface A10 as shown in FIG. 6 or 7), while control channel C30 is a component of a 1× air interface (e.g. air interface A15 as shown in FIG. 6 or 7). Specifically, traffic channel C10 may correspond to the Forward Traffic Channel, and control channel C20 may correspond to the Data Rate Control Channel, as specified in Sections 9.1.2.1 and 9.3.1.3.2.3, and Sections 9.1.2.4 and 9.2.1.3.3.3, respectively, of the IS-856 standard document referenced above, while control channel C30 may correspond to the Paging Channel as specified in Section 3.1.3.4 of part 2 of the IS-2000 standard document referenced above.

In the example of FIG. 9, HAT 200 receives data from RAN 20 over traffic channel C10. For example, HAT 200 may be engaged in an active session with an entity on the Internet such as remote server 50 in FIG. 4. Upon a specified event (e.g. the approach of a paging slot as assigned to HAT 200 by the network of RAN 25), HAT 200 transmits a pause signal to RAN 20 over control channel C20. In the particular implementation described above, HAT 200 transmits the pause command by setting the Data Rate Control (DRC) value to a null value (i.e. the value 0x0 as noted in Table 8.4.5.5.1.1-1 of the IS-856 standard document referenced above).

HAT 200 monitors the control channel C30 for transmissions from RAN 25. Upon another specified event (e.g. the end of the assigned paging slot, possibly including a buffer period to account for a propagation delay of the paging signal), HAT 200 transmits the resume command by setting the DRC value to a non-null value (i.e. as noted in Table 8.4.5.5.1.1-1 referenced above). Upon a different specified event (e.g. the reception of a paging message during the assigned paging slot), HAT 200 may perform other tasks in addition to task T400 (such as recording the information in the paging message) or instead of task T400 (such as responding to the paging message).

FIG. 9 shows an example in which HAT 200 transmits both the pause and resume commands to RAN 20. Note, however, that the pause and resume commands may actually be directed to an underlying PDSN. In this case, it is possible that between the transmission of these commands, a handoff of the air interface including channels C10 and C20 (and an associated handoff of the corresponding logical link to the PDSN) from a RAN 20*a* to a different RAN 20*b* within the same wireless network will occur, such that RAN 20*a* receives the pause command but RAN 20*b* receives the resume command.

Certain advantages may be achieved in an implementation of a system as shown in FIG. 9 and described above. For example, responsiveness to pages from RAN 25 may be continued without modification to RAN 20 or 25, the air interfaces A10 and A15, or any associated logical link (e.g. to a PDSN). Further, by transmitting the pause command before monitoring begins, HAT 220 may allow RAN 20 to allocate the unused channel capacity to other uses and/or to other users. Moreover, by transmitting the pause command before monitoring begins, HAT 220 may also forestall a need for RAN 20 to retransmit data that was transmitted and lost during the monitoring task. In other implementations of a system including one or more embodiments of the invention, one or more of these advantages may not be present or may be present to a greater or lesser extent, while other advantages may also be realized.

Figure 10:
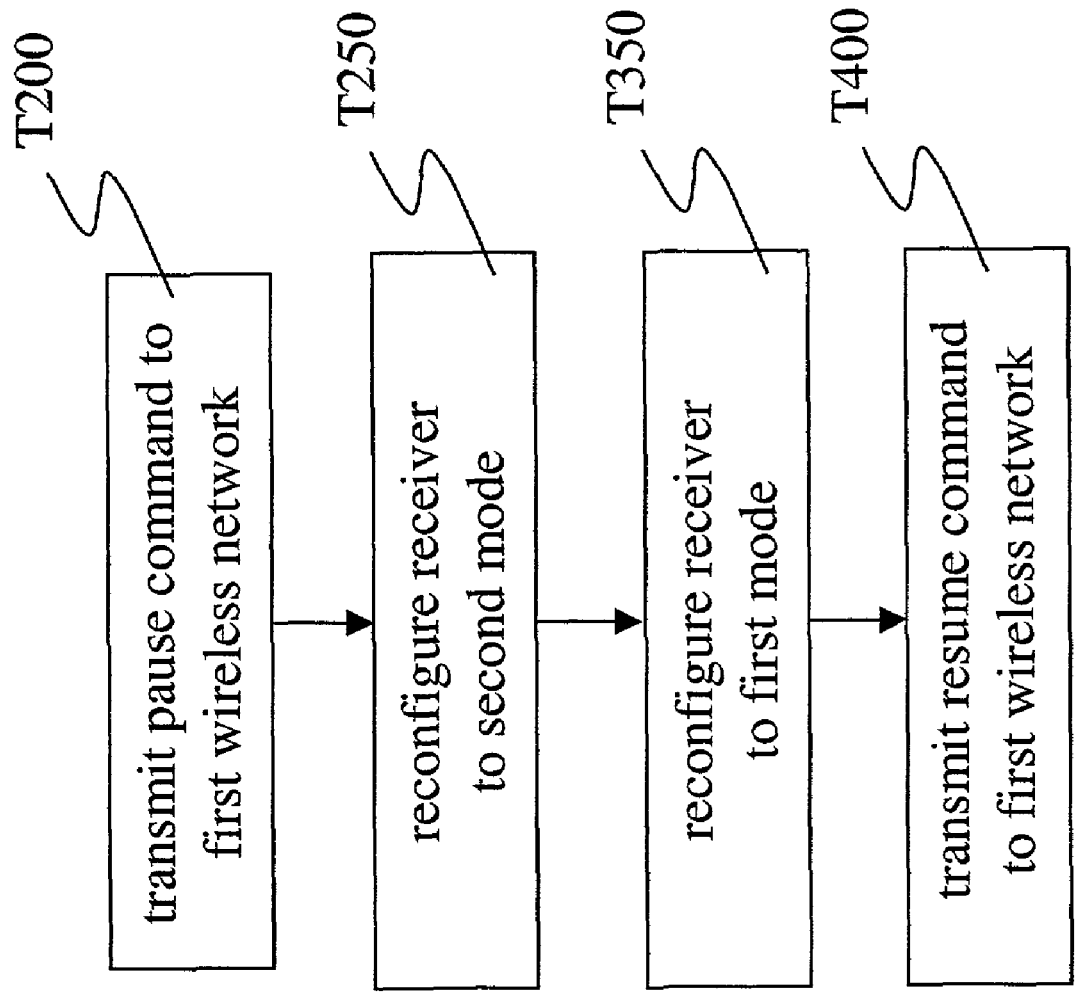
FIG. 10 shows a flowchart for a method according to another embodiment of the invention.

FIG. 10 shows a flowchart for a method according to another embodiment of the invention. In task T200, a pause command is transmitted to a first wireless network. In task T250, reconfiguring a receiver to a second mode (a mode corresponding to communication with a second wireless network) is performed, and in task T350, reconfiguring the receiver to a first mode (a mode corresponding to communication with the first wireless network) is performed. In a system as shown in FIG. 9, for example, task T250 may include tuning a RF stage of HAT 200 from a frequency of traffic channel C10 to a frequency of control channel C30, and task T350 may include tuning the RF stage of HAT 200 from a frequency of control channel C30 to a frequency of traffic channel C10. Reconfiguring the receiver from one mode to another may include changing or restoring other features of HAT 200, such as one or more parameters of a coding or modulation scheme or the values of one or more state variables. In task T400, a resume command is transmitted to the first wireless network.

Figure 11:
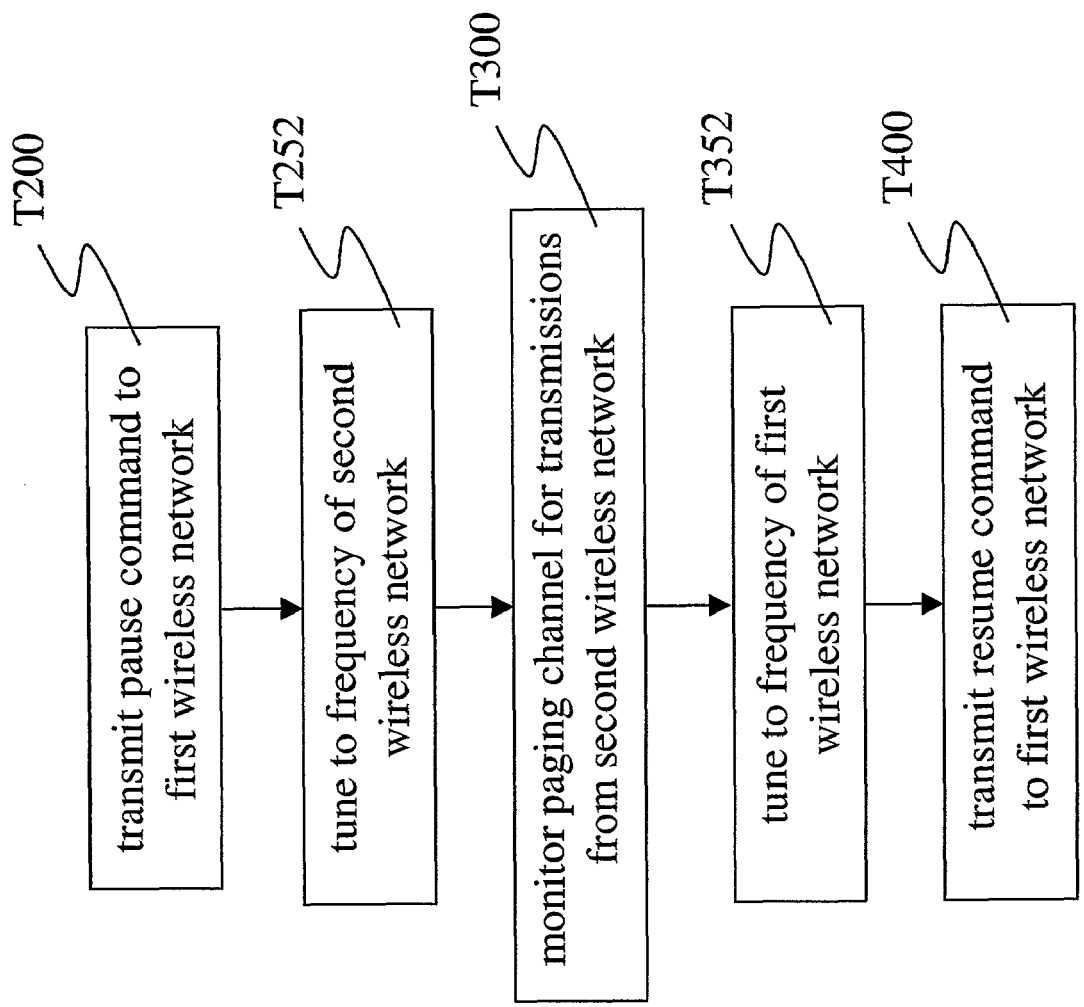
FIG. 11 shows a flowchart for a method according to another embodiment of the invention.

FIG. 11 shows a flowchart for a method according to another embodiment of the invention. In addition to the tasks as shown in FIG. 8, this method includes tuning to a frequency of the second wireless network (e.g. a frequency of control channel C30) in task T252 and tuning to a frequency of the first wireless network (e.g. a frequency of traffic channel C10) in task T352.

Figure 12:
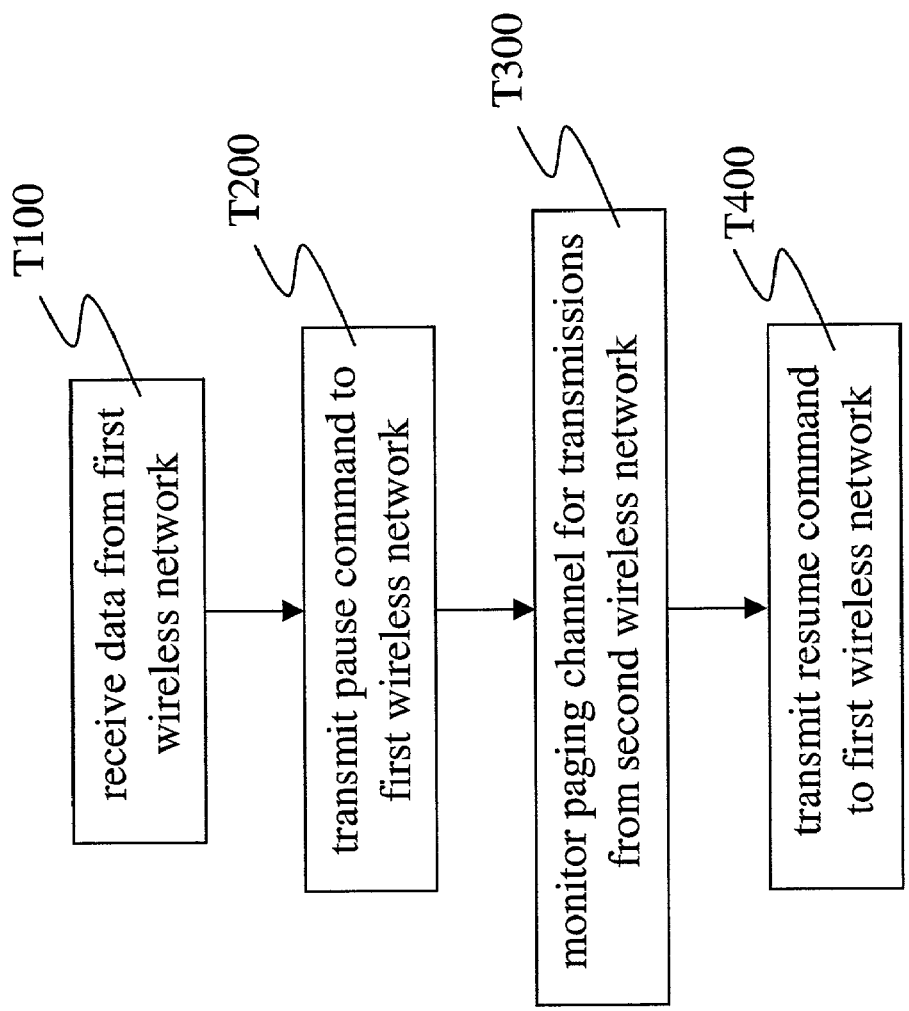
FIG. 12 shows a flowchart for a method according to another embodiment of the invention.

FIG. 12 shows a flowchart for a method according to a further embodiment of the invention. In addition to the tasks as shown in FIG. 8, this method includes receiving data from the first wireless network in task T100. In a system as shown in FIG. 9, for example, HAT 200 may receive data from RAN 20 over traffic channel C10.

Figure 13:
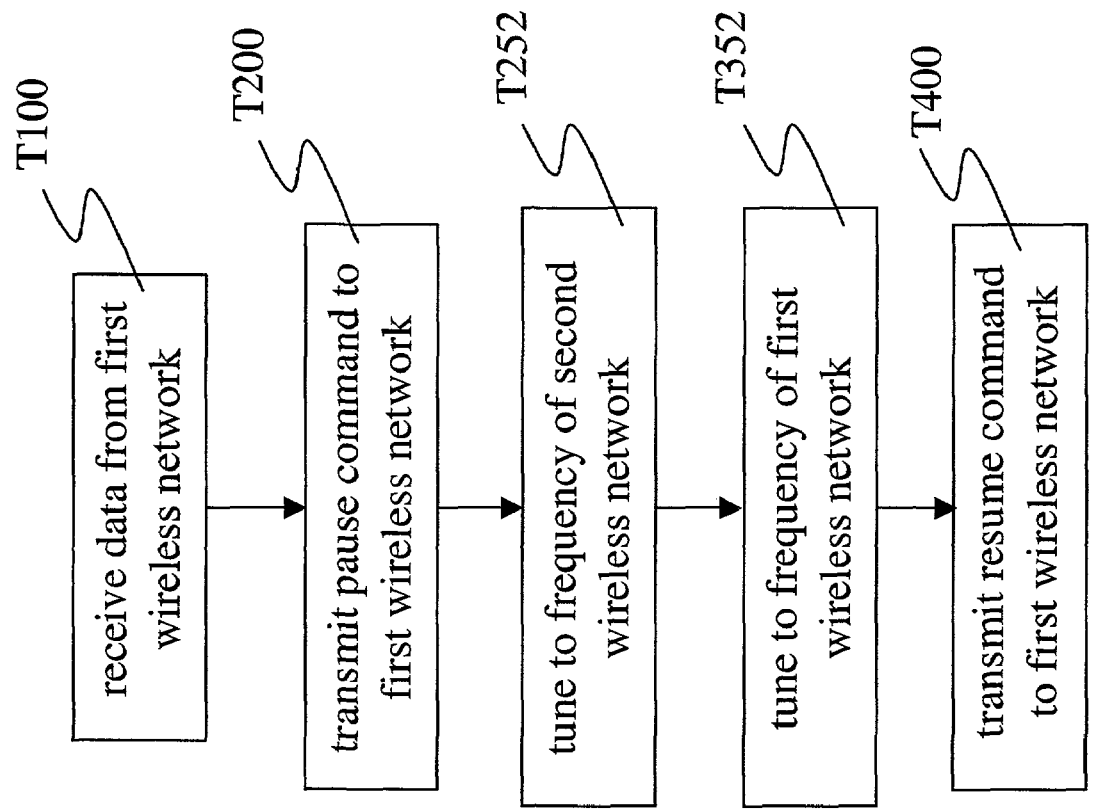
FIG. 13 shows a flowchart for a method according to another embodiment of the invention.

FIG. 13 shows a flowchart for a method according to a further embodiment of the invention. In addition to the tasks as shown in FIG. 10, this method includes receiving data from the first wireless network in task T100.

Figure 13A:
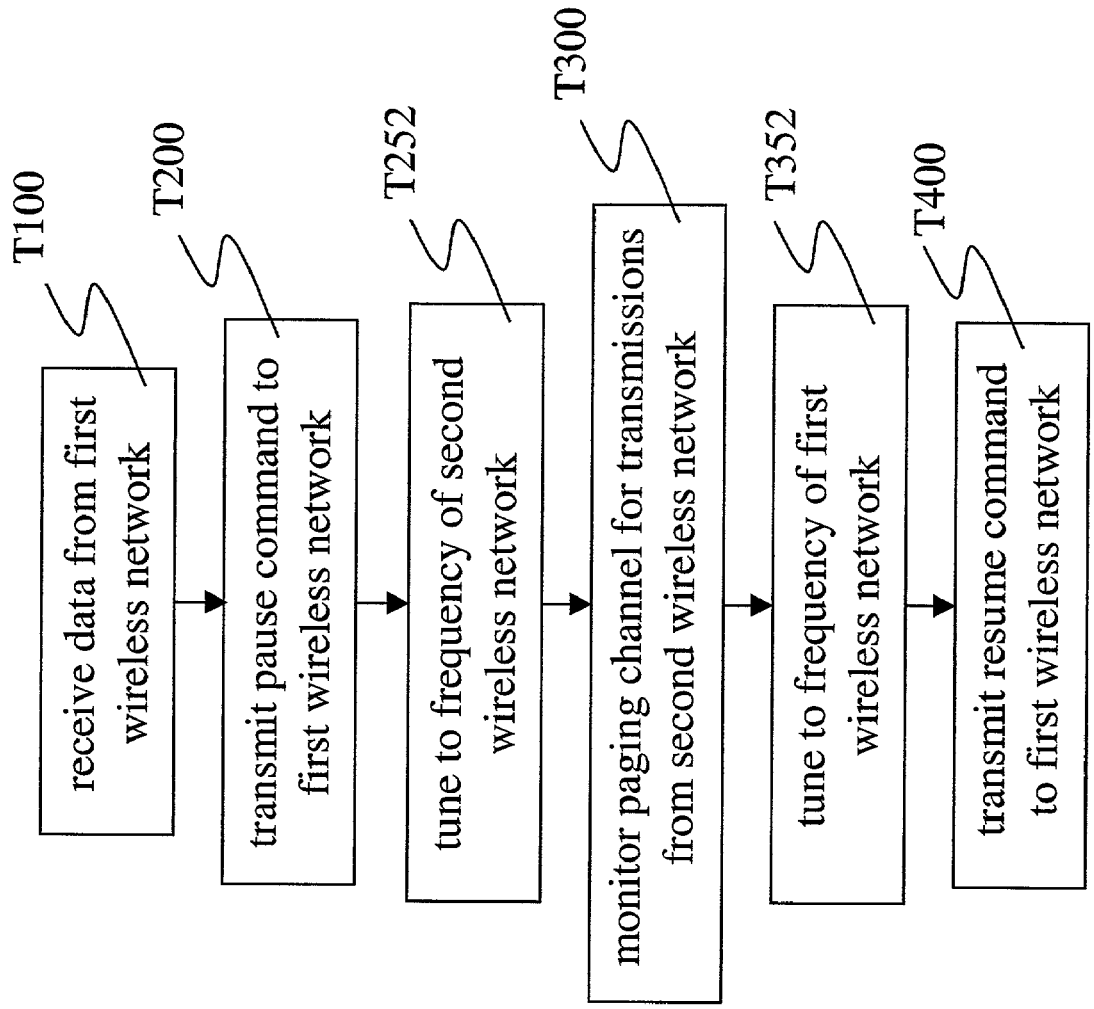
FIG. 13A shows a flowchart for a method according to another embodiment of the invention.

FIG. 13A shows a flowchart for a method according to a further embodiment of the invention. In addition to the tasks as shown in FIG. 13, this method includes monitoring a paging channel for transmissions from a second wireless network in task T300.

Figure 14:
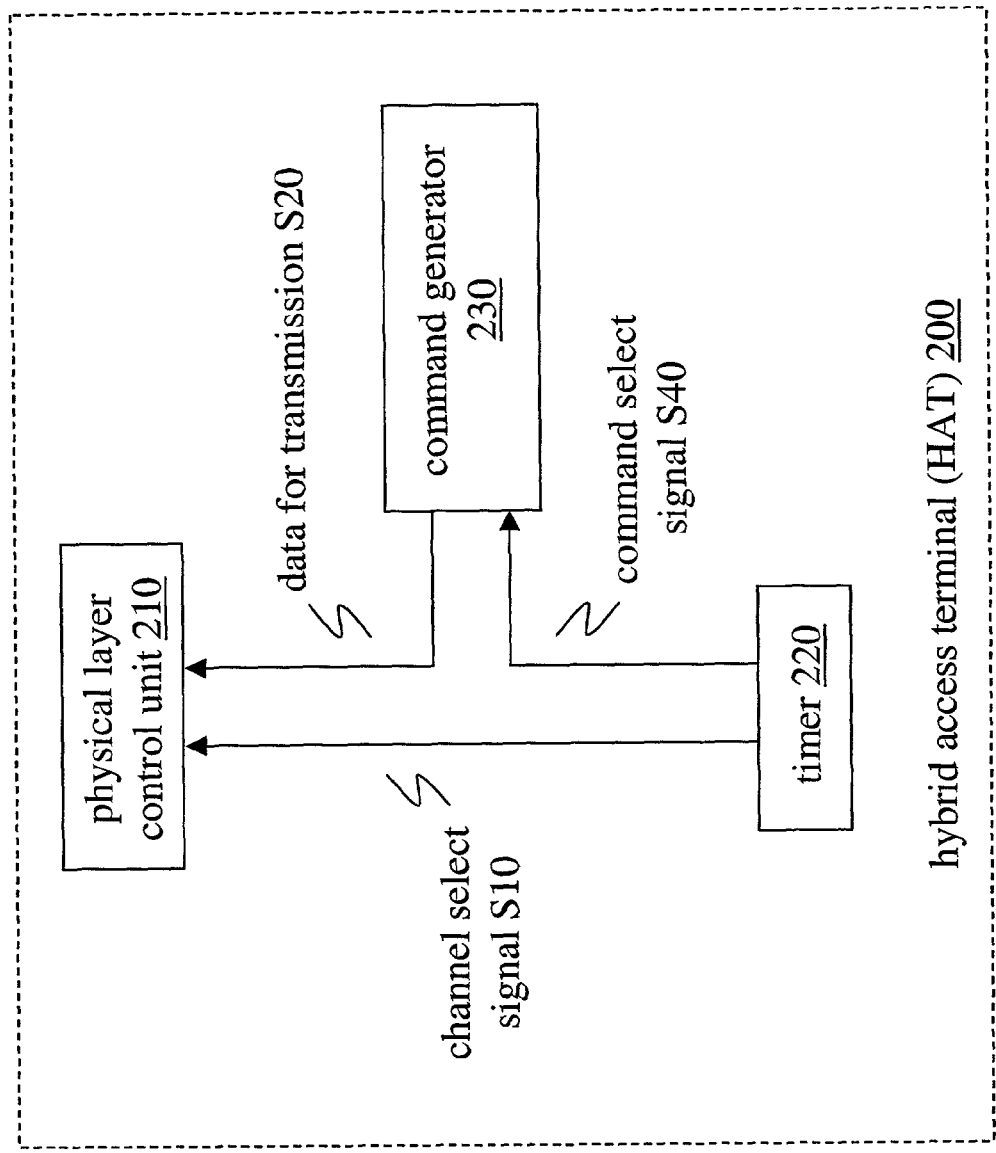
FIG. 14 shows a block diagram for a hybrid access terminal according to an embodiment of the invention.

FIG. 14 shows a block diagram for a hybrid access terminal 200 according to an embodiment of the invention. Timer 220 indicates a specified event (e.g. the approach of a paging slot on a second wireless network) to command generator 230 via command select signal S40, causing command generator 230 to select a pause command. Command generator 230 forwards data for transmission S20, including the pause command, to physical layer control unit 210 for transmission to a first wireless network. It is understood that one or more among command generator 230 and physical layer control unit 210 may perform other operations on the command before transmission (including but not limited to error correction coding, interleaving, and modulation).

Figure 15:
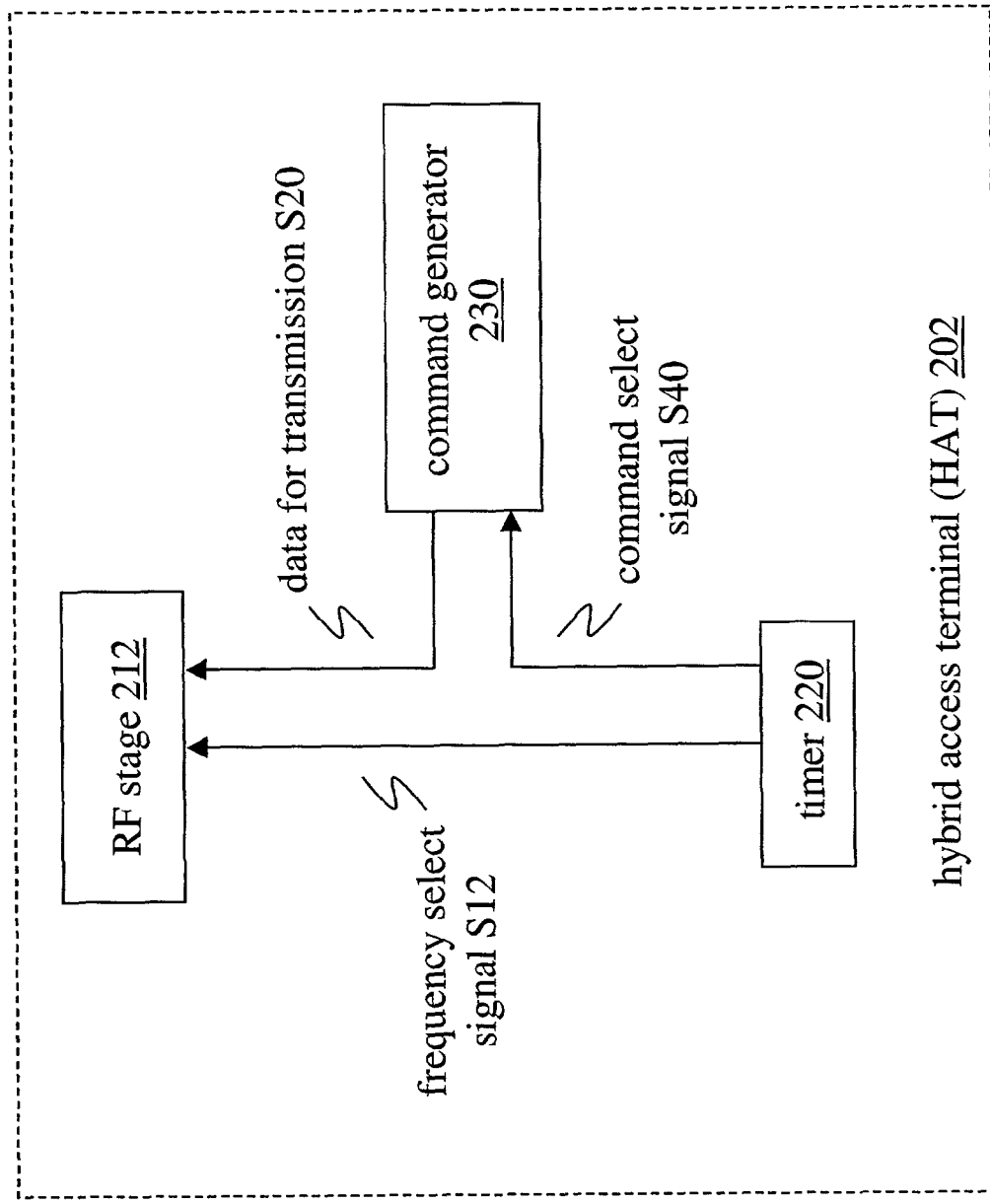
FIG. 15 shows a block diagram for a hybrid access terminal according to another embodiment of the invention.

At a time subsequent to the transmission of the pause command, timer 220 indicates a first channel selection to physical layer control unit 210 via channel select signal S10. Alternatively, timer 220 (or another unit or module) may indicate the first channel selection at a time prior to completion of the transmission of the pause command but subsequent to receipt of the most recent packet data transmission. In a HAT 202 as shown in FIG. 15, physical layer control unit 210 may include or may be implemented as a RF stage 212. In this case, channel select signal S10 may be implemented as a frequency select signal S12, indicating a selection of at least a frequency for reception to RF stage 212. In other implementations, channel select signal S10 may indicate a selection of time slot, coding scheme, and/or modulation scheme instead of or in addition to a selection of frequency.

At a time subsequent to the indication of the first channel selection (e.g. at or near to the end of the paging slot), timer 220 indicates a second channel selection to physical layer control unit 210 over channel select signal S10. In a HAT 202 as shown in FIG. 15, for example, timer 220 may indicate a return to the original frequency for transmission and/or reception. Timer 220 then signals command generator 230 via command select signal S40 to select a resume command. In a HAT for use with a IS-856 network, the pause and resume commands may include DRC values as described above.

In one example, timer 220 and command generator 230 are implemented at least in part as sets of instructions executing on the same processing unit (e.g. an embedded processor or other array of logic elements). In another example, command generator 230 is implemented at least in part as an interrupt service routine (ISR), and timer 220 is implemented as a hardware or software module that issues a interrupt request signal corresponding to the ISR upon a specified event (e.g. a timeout). In a further example, timer 220 compares a time of completion of receipt of a packet data transmission to a start time of the next paging slot. In this case, timer 220 may issue an indication to command generator 230 and/or physical layer control unit 210 when an interval between these times is below a predetermined threshold.

If a mode (e.g. a frequency) of traffic channel C10 determines or otherwise affects a mode of control channel C20, then it may be desirable to wait until after transmission of the pause command is complete before reconfiguring the receiver (e.g. according to channel select signal S10) to a mode corresponding to control channel C30. In another situation, it may be desired to reconfigure the receiver to a mode corresponding to control channel C30 even before transmission of the pause signal over control channel C20 has completed.

Figure 16:
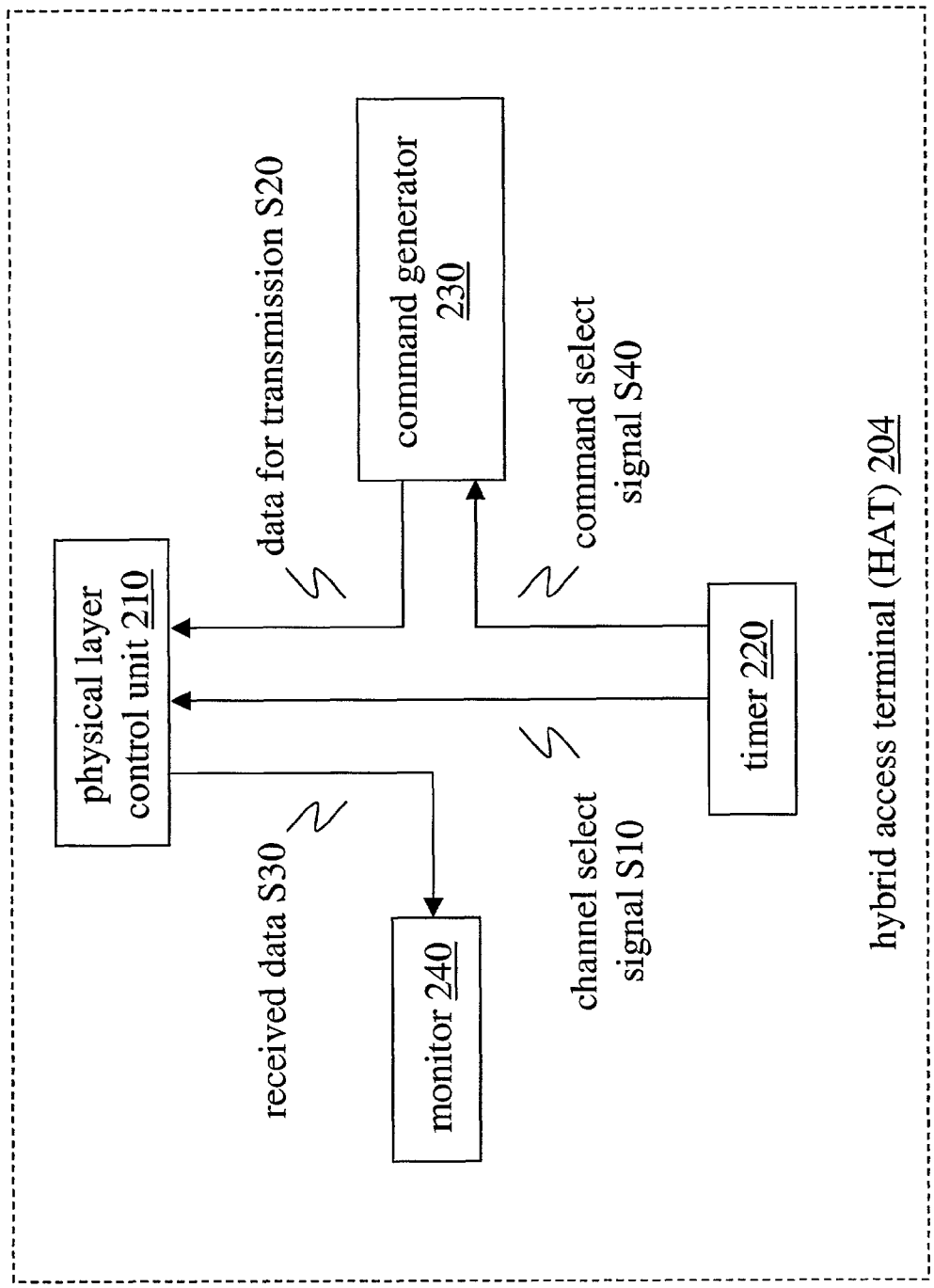
FIG. 16 shows a block diagram for a hybrid access terminal according to another embodiment of the invention.

FIG. 16 shows a block diagram for a hybrid access terminal according to another embodiment of the invention. At a time subsequent to the first channel select indication, physical layer control unit 210 forwards received data S30 to monitor 240. Received data S30 may be a null signal (e.g. indicating an absence of incoming pages) or may include pages for other terminals. If monitor 240 detects a specified condition on received data S30 (e.g. data indicating an incoming page from the second network for HAT 204), monitor 240 may indicate the condition to another unit for appropriate action. Such action may include, for example, recording information relating to an incoming page or responding to an incoming page.

If the specified condition is not detected, timer 220 indicates the second channel change to physical layer control unit 210 as described above. In one example, one or more among timer 220, command generator 230, and monitor 240 may be implemented at least in part as sets of instructions executing on the same processing unit. Other conditions that monitor 240 may detect in this or other implementations include broadcast messages, emergency messages, and/or other control sequences directed to the HAT (and possibly to other terminals as well) by the second network, possibly over one or more channels other than the paging channel (for example, a broadcast channel).

Figure 17:
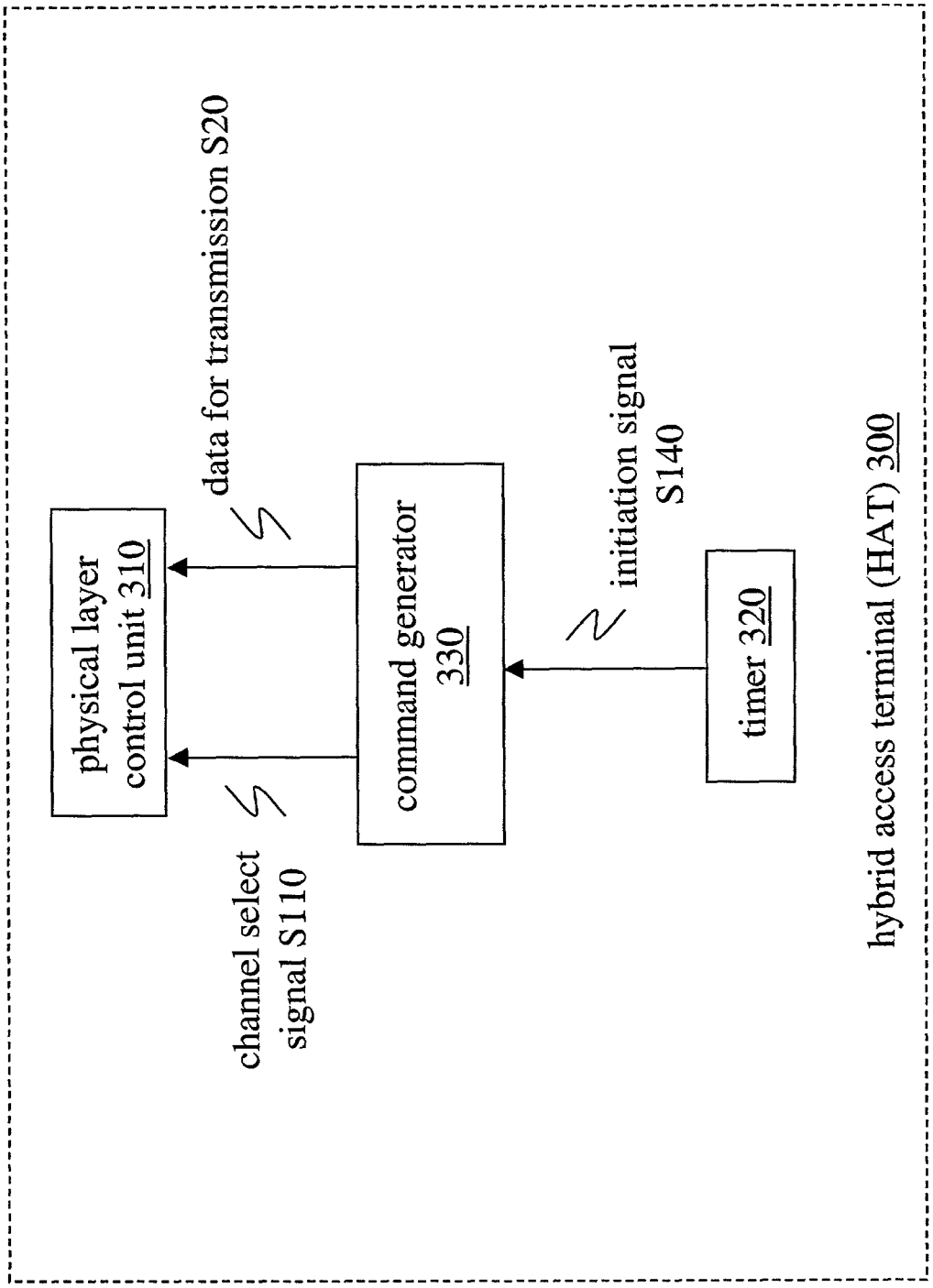
FIG. 17 shows a block diagram for a hybrid access terminal according to another embodiment of the invention.

FIG. 17 shows a block diagram for a hybrid access terminal according to another embodiment of the invention. Upon a specified event as described above (e.g. the approach of a paging slot on a second wireless network), timer 320 issues an initiation signal S140 to command generator 330. In response to initiation signal S140, command generator 330 forwards data for transmission S20, including a pause command, to physical layer control unit 310 for transmission to a first wireless network.

Figure 18:
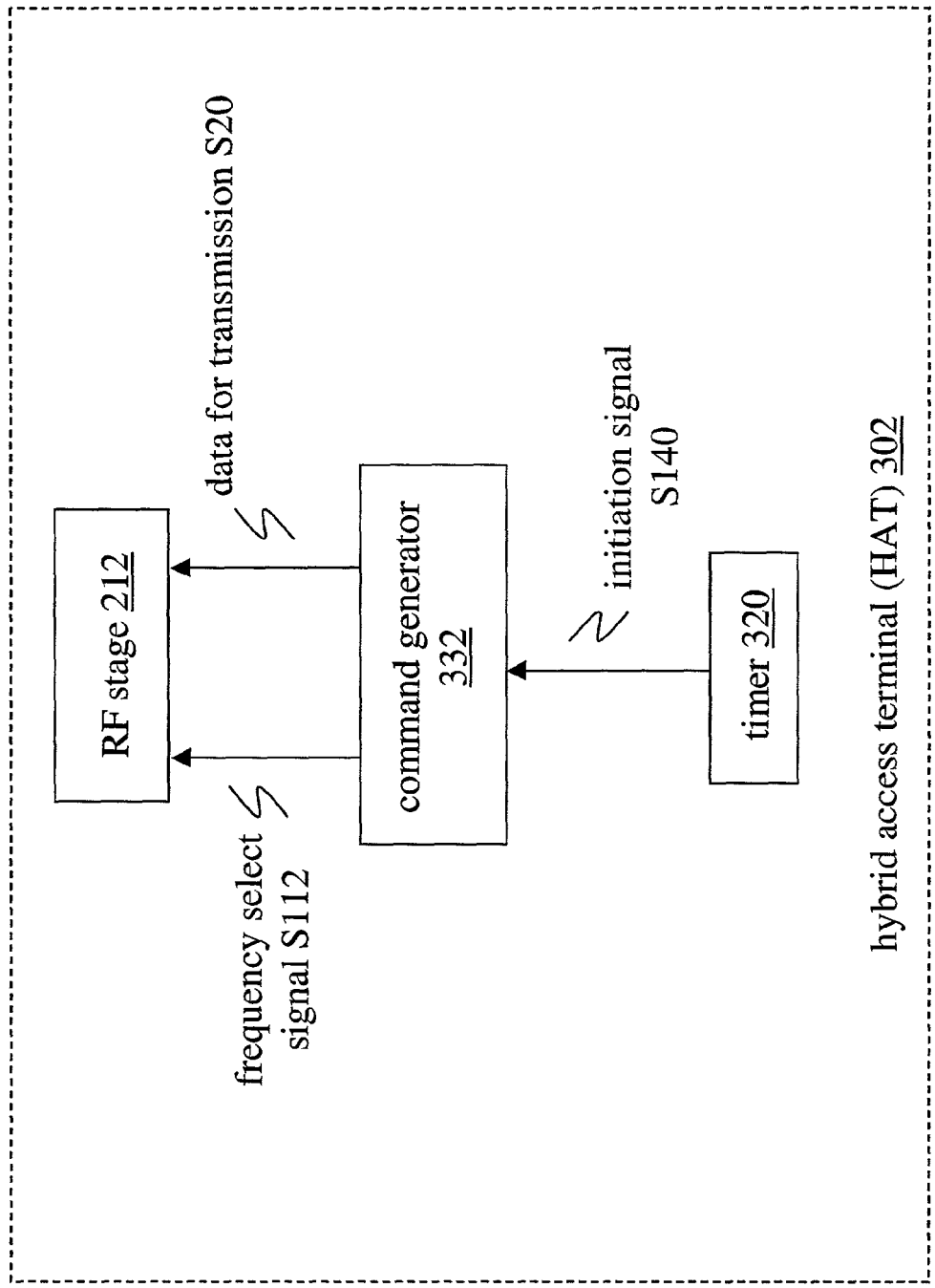
FIG. 18 shows a block diagram for a hybrid access terminal according to another embodiment of the invention.

In response to initiation signal S140 (and possibly at a time subsequent to the transmission of the pause command), command generator 330 also indicates a first channel selection to physical layer control unit 310 via channel select signal S110. In a HAT 302 as shown in FIG. 18, physical layer control unit 310 may be implemented as a RF stage 312. In this case, channel select signal S100 may be implemented as a frequency select signal S112, indicating a selection of at least a frequency for reception to RF stage 312.

At a time subsequent to the indication of the first channel selection (e.g. at a time near the end of the paging slot), command generator 330 indicates a second channel selection to physical layer control unit 310 over channel select signal S110. In a HAT 302 as shown in FIG. 18, for example, command generator 330 may indicate a return to the original frequency for transmission and/or reception. At or near this time, command generator 330 also forwards data for transmission S20, including a resume command, to physical layer control unit 310 for transmission to the first wireless network. In a HAT for use with an IS-856 network, the pause and resume commands may include DRC values as described above.

In one example, timer 320 and command generator 330 may be implemented at least in part as sets of instructions executing on the same processing unit. In a particular case, command generator 330 may be implemented at least in part as an interrupt service routine (ISR). In another example, command generator 330 is implemented at least in part as an interrupt service routine (ISR), and initiation signal S140 is an interrupt request signal that causes an array of logic elements to execute the ISR.

A hybrid access terminal as shown in FIG. 17 or FIG. 18 may also include a monitor 240 as shown in FIG. 16 and described above. In one example, one or more among timer 320, command generator 330, and monitor 240 may be implemented at least in part as sets of instructions executing on the same processing unit.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit (ASIC), or as a firmware program loaded into non-volatile storage or a software program loaded from or into a data storage medium as machine-readable code, such code being instructions executable by an array of logic elements such as a microprocessor or other digital signal processing unit.

The various illustrative logical blocks, modules, circuits, and/or tasks described herein may be implemented as electronic hardware, sequences of executable instructions, or combinations of both. Such features may be implemented with or performed by an array of logic elements such as a general-purpose processor, a digital signal processor, an ASIC, a field-programmable gate array or other programmable logic device, discrete gate or transistor logic, discrete hardware components, or any combination thereof. A general-purpose processor may be a microprocessor, but in the alternative, the processor may be any conventional processor, controller, microcontroller, or state machine. A processor may also be implemented as a combination of computing devices (e.g. a plurality of microprocessors, a combination of a DSP or DSP core and one or more microprocessors, or any other such configuration).

Tasks as described herein may be embodied directly in hardware, in software modules executed by one or more arrays of logic elements, or in a combination of the two. A software module may reside in random-access memory, flash memory, ferroelectric memory, read-only memory (ROM), programmable ROM (e.g. EPROM or EEPROM), registers, a fixed or removable disk (whether magnetic, optical, and/or phase-change), or any other form of data storage medium. Such a storage medium may be coupled to an array of logic elements as described above such that the array may read information from and/or write information to the storage medium. The array and the storage medium may reside as discrete components in an access terminal or other user device. Alternatively, the array and the storage medium may reside in an ASIC, or the storage medium may be integrated into the array.

Embodiments including features as described herein and equivalents thereof may be applied to IS-856-compliant and 1× networks as well as to other networks carrying data, packet data, and/or voice information. Thus, the present invention is not intended to be limited to the described embodiments but rather is to be accorded the widest scope consistent with the principles and novel features disclosed in any fashion herein.

I claim:

1. A method of conducting wireless data communications comprising:
   receiving a packet data transmission from a first wireless network over a first traffic channel;
   transmitting a pause command to the first wireless network to temporarily suspend data transmission over the first traffic channel;
   reconfiguring a receiver from a mode corresponding to communication with the first wireless network to a mode corresponding to communication with a second wireless network;
   monitoring a paging channel of the second wireless network;
   reconfiguring the receiver from the mode corresponding to communication with the second wireless network to the mode corresponding to communication with the first wireless network; and
   transmitting a resume command to the first wireless network to resume data transmission over the first traffic channel.

2. The method of conducting wireless data communications according to claim 1, wherein transmitting a pause command to the first wireless network includes transmitting a pause command to a packet data serving node via the first wireless network, and
   wherein transmitting a resume command to the first wireless network includes transmitting the resume command to the packet data serving node via the first wireless network.

3. The method of conducting wireless data communications according to claim 2, wherein receiving a packet data transmission from a first wireless network includes receiving a packet data transmission from the packet data serving node via the first wireless network.

4. The method of conducting wireless data communications according to claim 1, wherein reconfiguring the receiver includes changing a frequency of a radio-frequency stage.

5. The method of conducting wireless data communications according to claim 1, wherein the pause command includes a command to reduce a data rate.

6. The method of conducting wireless data communications according to claim 1, wherein the pause command includes a command to set a null data rate.

7. The method of conducting wireless data communications according to claim 6, wherein reconfiguring the receiver includes changing a frequency of a radio-frequency stage.

8. The method of conducting wireless data communications according to claim 6, wherein the resume command includes a command to set a non-null data rate.

9. The method of conducting wireless data communications according to claim 1, wherein the resume command includes a command to set a non-null data rate.

10. The method of conducting wireless data communications according to claim 1, wherein the first traffic channel utilizes the same relative time slot, frequency, and/or coding parameters before data transmission is temporarily suspended via the pause command and after data transmission is resumed via the resume command.

11. A method of conducting wireless data communications comprising:
    receiving a packet data transmission from a first wireless network over a first wireless channel;
    transmitting a pause command to the first wireless network to temporarily suspend data transmission over the first wireless channel; and
    monitoring a second wireless channel for transmissions from a second wireless network; and
    transmitting a resume command to the first wireless network to resume data transmission over the first wireless channel, wherein said monitoring occurs between said transmitting a pause command and said transmitting a resume command.

12. The method of conducting wireless data communications according to claim 11, wherein the pause command includes a command to set a null data rate.

13. The method of conducting wireless data communications according to claim 12, wherein the resume command includes a command to set a non-null data rate.

14. A data storage medium having machine-readable code, the machine-readable code including instructions executable by an array of logic elements, said instructions defining a method of conducting wireless data communications comprising:
    receiving a packet data transmission from a first wireless network over a first traffic channel;
    transmitting a pause command to the first wireless network to temporarily suspend data transmission over the first traffic channel;
    reconfiguring a receiver from a mode corresponding to communication with the first wireless network to a mode corresponding to communication with a second wireless network;
    monitoring a paging channel of the second wireless network;
    reconfiguring the receiver from the mode corresponding to communication with the second wireless network to the mode corresponding to communication with the first wireless network; and
    transmitting a resume command to the first wireless network to resume data transmission over the first traffic channel.

15. An access terminal configured and arranged to receive packet data transmissions from a first wireless network over a first traffic channel, said access terminal comprising:
    a timer configured and arranged to send an indication at a time near a start of a paging slot;
    a command generator configured and arranged to issue a pause command in response to the indication;
    a physical layer control unit configured and arranged to transmit the pause command to the first wireless network to temporarily suspend data transmission over the first traffic channel; and
    a monitor configured and arranged to monitor a paging channel during the paging slot for transmissions transmitted by a second wireless network at least to the access terminal,
    wherein the physical layer control unit is further configured and arranged to transmit a resume command to the first wireless network at a time near an end of the paging slot to resume data transmission over the first traffic channel.

16. The access terminal according to claim 15, wherein the indication includes an interrupt request signal.

17. The access terminal according to claim 15, wherein the command generator is further configured and arranged to issue the resume command.

18. The access terminal according to claim 15, wherein the pause command includes a command to set a null data rate.

19. The access terminal according to claim 18, wherein the resume command includes a command to set a non-null data rate.

20. The access terminal according to claim 15, wherein the pause command is directed to a packet data serving node.

21. The access terminal according to claim 20, wherein the resume command is directed to the packet data serving node.

22. The access terminal according to claim 15, wherein the physical layer control unit is further configured and arranged to receive the packet data transmissions from the first wireless network over the first traffic channel, and
    wherein, near a start of the paging slot, a mode of the physical layer control unit is changed from a mode corresponding to the first traffic channel to a mode corresponding to the paging channel.

23. The access terminal according to claim 22, wherein the physical layer control unit includes a radio-frequency stage, and
    wherein changing a mode of the physical layer control unit includes changing a frequency of the physical layer control unit.

24. The access terminal according to claim 22, wherein, near an end of the paging slot, a mode of the physical layer control unit is changed from the mode corresponding to the paging channel to the mode corresponding to the first traffic channel.

25. An access terminal configured and arranged to receive data transmissions from a first wireless network over a first traffic channel, said access terminal comprising:
    a timer configured and arranged to send an indication at a time near a start of a time slot;
    a command generator configured and arranged to issue a pause command in response to the indication to temporarily suspend data transmission over the first traffic channel; and a monitor configured and arranged to monitor a different channel during the time slot for transmissions transmitted by a second wireless network at least to the access terminal, wherein the command generator is further configured and arranged to issue a resume command at a time near an end of the time slot to resume data transmission over the first traffic channel, and wherein the pause command and the resume command are transmitted to the first wireless network.

26. The access terminal according to claim 25, wherein the pause command includes a command to set a null data rate.

27. The access terminal according to claim 26, wherein the resume command includes a command to set a non-null data rate.

28. The access terminal according to claim 25, wherein the indication includes an interrupt request signal.

29. A wireless apparatus comprising:

means for receiving a packet data transmission from a first wireless network over a first traffic channel;

means for transmitting a pause command to the first wireless network to temporarily suspend data transmission over the first traffic channel;

means for reconfiguring a receiver from a mode corresponding to communication with the first wireless network to a mode corresponding to communication with a second wireless network;

means for monitoring a paging channel of the second wireless network;

means for reconfiguring the receiver from the mode corresponding to communication with the second wireless network to the mode corresponding to communication with the first wireless network; and means for transmitting a resume command to the first wireless network to resume data transmission over the first traffic channel.

* * * * *